United States Patent
Sood et al.

(10) Patent No.: US 8,422,678 B2
(45) Date of Patent: Apr. 16, 2013

(54) METHOD, APPARATUS AND SYSTEM FOR PROTECTING SECURITY KEYS ON A WIRELESS PLATFORM

(75) Inventors: Kapil Sood, Beaverton, OR (US); Ned Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 11/281,982

(22) Filed: Nov. 16, 2005

(65) Prior Publication Data

US 2007/0110245 A1    May 17, 2007

(51) Int. Cl.
*H04L 29/06* (2006.01)
(52) U.S. Cl.
USPC .......................................................... 380/270
(58) Field of Classification Search .................. 455/432, 455/436; 380/270, 278–279; 713/164–167, 713/189–193
See application file for complete search history.

(56) References Cited

U.S. PATENT DOCUMENTS

| | | | |
|---|---|---|---|
| 2004/0242228 A1* | 12/2004 | Lee et al. | 455/432.1 |
| 2005/0091486 A1* | 4/2005 | Avraham et al. | 713/162 |
| 2006/0083377 A1* | 4/2006 | Ptasinski | 380/270 |
| 2006/0089819 A1* | 4/2006 | Dubal | 702/183 |
| 2006/0121883 A1* | 6/2006 | Faccin | 455/411 |
| 2006/0136720 A1* | 6/2006 | Armstrong et al. | 713/164 |
| 2006/0191000 A1* | 8/2006 | O'Hara et al. | 726/12 |
| 2006/0236127 A1* | 10/2006 | Kurien et al. | 713/193 |
| 2010/0135487 A1* | 6/2010 | Lee et al. | 380/46 |

OTHER PUBLICATIONS

Intel Active Management Technology Small Business Adminstrator's Guide Version 1.02. Published Feb. 2005.*

* cited by examiner

*Primary Examiner* — Eleni A Shiferaw
*Assistant Examiner* — Phy Anh Vu
(74) *Attorney, Agent, or Firm* — Caven & Aghevli LLC (57) ABSTRACT

A method, apparatus and system enable security keys to be processed in a dedicated partition on a secure wireless platform. Specifically, embodiments of the present invention may utilize a secure processing area (i.e., a dedicated partition) to generate security keys and to utilize the security keys to perform a 4-way handshake to provide confidentiality and integrity protection for all data communication between the wireless node and an access point.

27 Claims, 5 Drawing Sheets

METHOD, APPARATUS AND SYSTEM FOR PROTECTING SECURITY KEYS ON A WIRELESS PLATFORM

BACKGROUND

Wireless networks are proliferating at a rapid pace as computer users become increasingly mobile. Wireless networks offer users significant flexibility to "roam" across networks without being tied to a specific location. One downside of wireless networks, however, is that they typically face significant security issues. Since the connection is "wireless", i.e., not physical, any party with a compatible wireless network interface may position themselves to inspect and/or intercept wireless packets. In other words, any third party hacker or attacker may, with relative ease, gain access to packets being transmitted across a wireless network, regardless of who the packets are actually destined for.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for protecting security keys on a wireless platform. More specifically, embodiments of the present invention provide a secure environment within which wireless platforms may generate, store and access security key material for enabling secure wireless protocols on wireless platforms. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
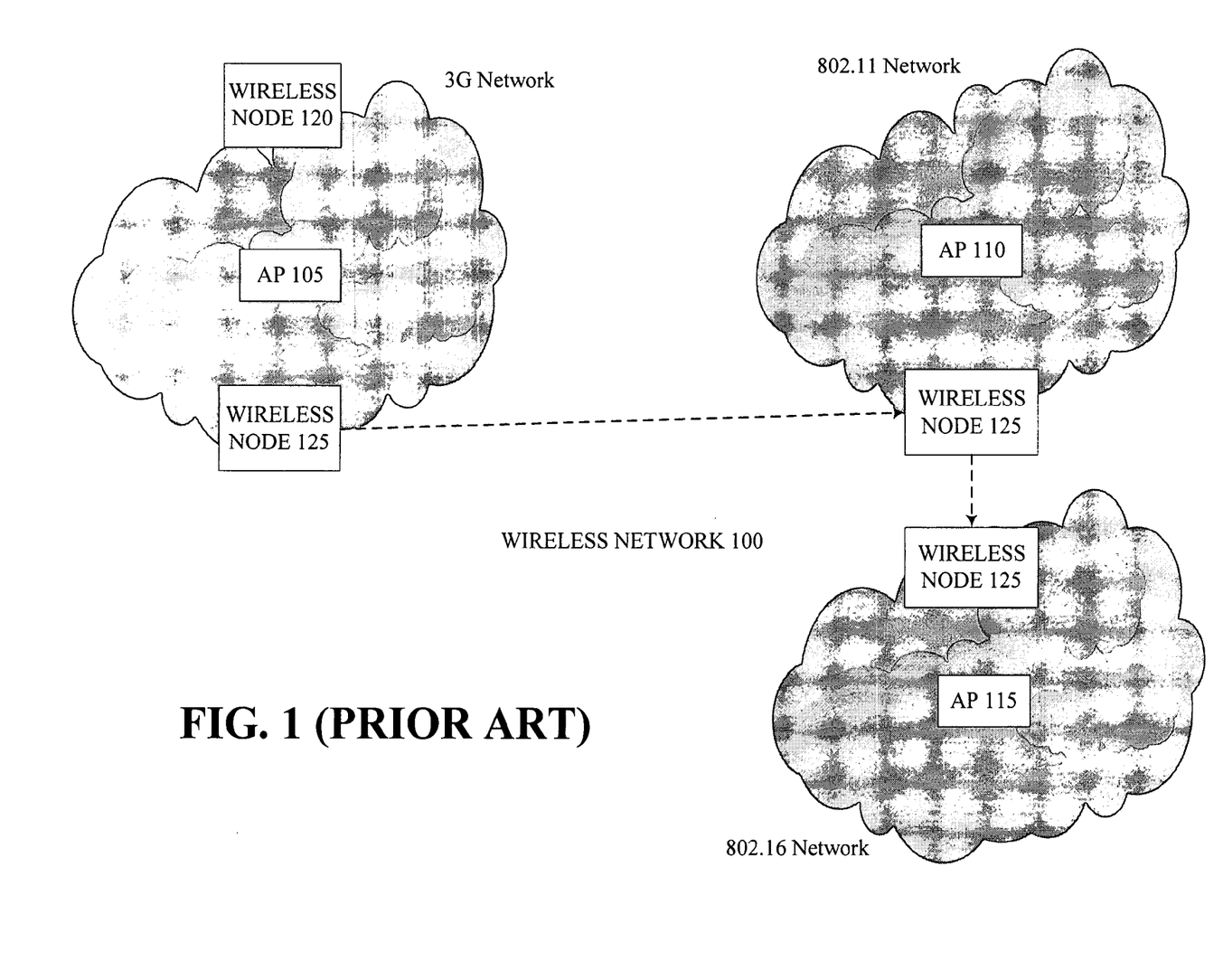
FIG. 1 illustrates a typical wireless network topology.

In order to facilitate understanding of embodiments of the present invention, FIG. 1 describes a typical wireless network topology. As illustrated in FIG. 1, Wireless Network 100 may comprise a collection of different types of networks (e.g., an 802.11 network, an 802.16 network and a "3G" network. 3G networks are well known to those of ordinary skill in the art and include networks that conform to the 3G International Telecommunications Union ("ITU") specification for mobile communications technology. In alternate embodiments, Wireless Network 100 may comprise the same types of networks and/or a different combination of network types.

Additionally, Wireless Network 100 may comprise any type of network architecture, including but are not limited to wireless local area networks ("WLANs"), wireless wide area networks ("WWANs") including 3G networks, wireless metropolitan area networks ("WMANs") and/or corporate intranets. As illustrated, Wireless Network 100 may include one or more access points or APs (illustrated conceptually as "AP 105", "AP 110" and "AP 115" in FIG. 1 and referred to collectively as "APs") and one or more end nodes (illustrated conceptually as "Wireless Node 120" and "Wireless Node 125" in FIG. 1 and referred to collectively as "Wireless Nodes"). It will be readily apparent to those of ordinary skill in the art that although only a handful of APs and Wireless Nodes are illustrated, embodiments of the present invention are not so limited.

Wireless Nodes 120 and 125 may comprise any type of device that is capable of communicating wirelessly with other devices. Generally such devices may include personal computers, servers, laptops, portable handheld computers (e.g., personal digital assistants or "PDAs"), set-top boxes, intelligent appliances, wireless telephones, web tablets, wireless headsets, pagers, instant messaging devices, digital cameras, digital audio receivers, televisions and/or other devices that may receive and/or transmit information wirelessly (including hybrids and/or combinations of the aforementioned devices). APs are "entry points" that provide wireless nodes with access to Wireless Network 100. APs and the Wireless Nodes may communicate with one another using protocols and standards established by the IEEE for wireless communications. For example, some embodiments may conform to the IEEE 802.11 standard, while other embodiments may conform to IEEE 802.16 networks and/or wired networks like IEEE 802.3 Ethernet LANs.

It will be readily apparent to those of ordinary skill in the art that APs may comprise a standalone device and/or be incorporated as part of another network device such as a network bridge, router, or switch. Each AP typically has a predetermined range within which a wireless node may freely roam without interruption. Thus, for example, as illustrated, if Wireless Node 125 is initially within the predetermined range of AP 105 but thereafter moves out of that range, Wireless Node 125 may have to reestablish its wireless connection via a new entry point (e.g., AP 115 at its new location). When Wireless Nodes come within the range of APs, the Wireless Nodes and APs typically engage in a series of messages that are designed to initiate a communications session between the Wireless Node and the APs. The Wireless Nodes and APs may additionally engage in various exchanges designed to establish a secure link between the two points. Further details of these interactions are described in detail later in the specification.

As previously described, Wireless Nodes and APs may engage in various exchanges designed to establish a secure link between the two points. A variety of encryption schemes may be utilized to enable secure wireless transmissions. These schemes, however, are typically only as secure as the host operating system ("OS") on the wireless devices. In other words, regardless of the various encryption and/or other 802.11 security measures that may be implemented, the security measures themselves are nonetheless limited by the vulnerability of the WNIC driver (installed on the host OS) and other OS components to various types of attacks. Thus, for example, although the IEEE 802.11 specification defines a "supplicant" to establish various security measures, this supplicant resides in the host OS and is nonetheless subject to attacks that may be levied at the OS. Additionally, Pairwise Master Key ("PMK") derivation on the host may be done using "EAP methods" on the host and an authentication server on the network, but since the result is a shared PMK between the host and the Authentication server (also known as the Policy Decision Point ("PDP")), this PMK on the host may be unsecure (e.g., it may be "sniffed" and transferred to a rogue device) when the PDP transfers the PMK to the AP.

As a result, wireless networks continue to be vulnerable to attacks that can significantly affect the security of the wireless sessions. Wireless network users are open, for example, to "man in the middle" ("MITM") attacks in which an attacker is able to read, insert and modify messages between two parties without either party knowing that the wireless connection between them has been compromised. Another type of attack comprises a "replay" technique wherein a message from a wireless node may be recoded by an unauthorized third party and then replayed at a later time to simulate a seemingly legitimate message and thereby gain access to the network.

According to an embodiment of the present invention, security keys may be generated within an isolated environment, remote from, and inaccessible by, the host OS. In one embodiment, the generated security keys may additionally be stored in and accessed from a location remote from and inaccessible by the host OS. More specifically, according to an embodiment of the invention, the security keys typically used to protect the WLAN communication session are generated and stored within the hardware accessible only by the secure environment and never read by the host OS. In one embodiment, this secure environment may also be capable of executing security protocols with network end-points. More specifically, this secure environment may execute a WLAN session key handshake protocol (described in further detail below) which derives Pairwise Transient Keys (PTKs), used to protect the data and management traffic between the host platform and the AP.

This isolated and secure environment may comprise a variety of different types of partitions, including an entirely separate hardware partition (e.g., utilizing Intel® Corporation's Active Management Technologies ("AMT"), "Manageability Engine" ("ME"), Platform Resource Layer ("PRL") and/or other comparable or similar technologies) and/or a virtualized partition (e.g., a virtual machine in Intel® Corporation's Virtualization Technology ("VT") scheme). It will be apparent to those of ordinary skill in the art that a virtualized host may also be used to implement AMT, ME and PRL technologies (as described in further detail below).

Figure 2:
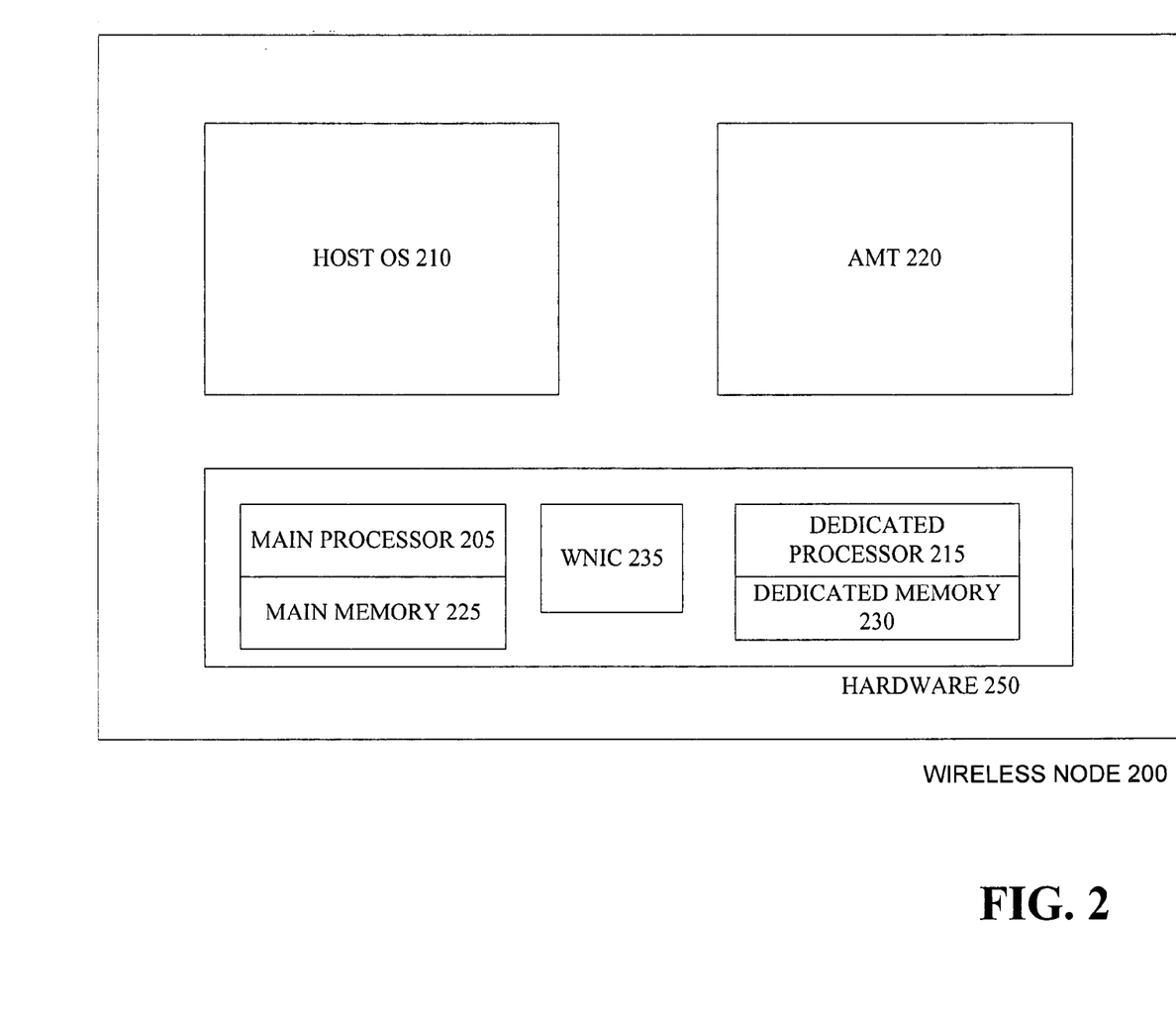
FIG. 2 illustrates an example AMT environment.

By way of example, FIG. 2 illustrates conceptually a typical AMT environment as implemented by Intel® Corporation. It will be readily apparent to those of ordinary skill in the art that embodiments of the present invention may also be implemented in other similar and/or comparable implementations of AMT. Only the components pertinent to describing the AMT environment have been illustrated in order not to unnecessarily obscure embodiments of the present invention, but it will be readily apparent to those of ordinary skill in the art that additional components may be included without departing from the spirit of embodiments of the invention.

Thus, as illustrated in FIG. 2, a wireless device ("Wireless Device 200") may include a host operating system ("Host OS 210") and system hardware ("Hardware 250"). According to one embodiment, Hardware 250 may include two processors, one to perform typical processing tasks for Host OS 210 ("Main Processor 205") while the other may be dedicated exclusively to managing the device via a dedicated partition ("Dedicated Processor 215" for "AMT 220"). Each processor may have associated resources on Wireless Device 200 and they may share one or more other resources. Thus, as illustrated in this example, Main Processor 205 and Dedicated Processor 210 may each have portions of memory dedicated to them ("Main Memory 225" and "Dedicated Memory 230" respectively) but they may share a wireless network interface card ("WNIC 235").

Figure 3:
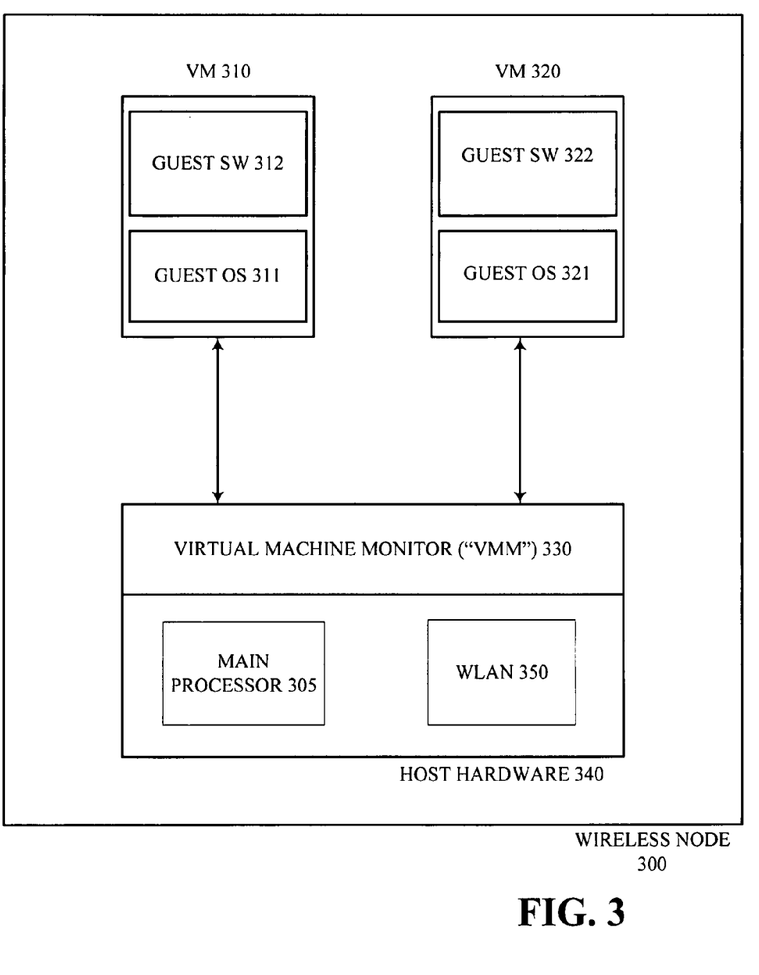
FIG. 3 illustrates an example virtual machine host.

Similarly, as illustrated in FIG. 3, if the wireless device ("Wireless Device 300") is virtualized, it may include only a single processor but a virtual machine monitor ("VMM 330") on the device may present multiple abstractions and/or views of the device or host, such that the underlying hardware of the host appears as one or more independently operating virtual machines ("VMs"). VMM 330 may be implemented in software (e.g., as a standalone program and/or a component of a host operating system), hardware, firmware and/or any combination thereof. VMM 330 manages allocation of resources on the host and performs context switching as necessary to cycle between various VMs according to a round-robin or other predetermined scheme. It will be readily apparent to those of ordinary skill in the art that although only one processor is illustrated ("Main Processor 305"), embodiments of the present invention are not so limited and multiple processors may also be utilized within a virtualized environment.

Although only two VM partitions are illustrated ("VM 310" and "VM 320", hereafter referred to collectively as "VMs"), these VMs are merely illustrative and additional virtual machines may be added to the host. VM 310 and VM 320 may function as self-contained platforms respectively, running their own "guest operating systems" (i.e., operating systems hosted by VMM 330, illustrated as "Guest OS 311" and "Guest OS 321" and hereafter referred to collectively as "Guest OS") and other software (illustrated as "Guest Software 312" and "Guest Software 322" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on Host 100. Within each VM, the Guest OS and/or Guest Software may behave as if they were, in effect, running on Wireless Device 300's physical hardware ("Host Hardware 340", which may include a wireless Network Interface Card ("WNIC 350")).

It will be readily apparent to those of ordinary skill in the art that a physical hardware partition with a dedicated processor (as illustrated in FIG. 2, for example) may provide a higher level of security than a virtualized partition (as illustrated in FIG. 3), but embodiments of the invention may be practiced in either environment and/or a combination of these environments to provide varying levels of security. It will also be readily apparent to those of ordinary skill in the art that an AMT, ME or PRL platform may be implemented within a virtualized environment. For example, VM 320 may be dedicated as an AMT partition on a host while VM 310 runs typical applications on the host. In this scenario, the host may or may not include multiple processors. If the host does include two processors, for example, VM 320 may be assigned Dedicated Processor 215 while VM 310 (and other VMs on the host) may share the resources of Main Processor 205. On the other hand, if the host includes only a single processor, the processor may serve both the VMs, but VM 320 may still be isolated from the other VMs on the host with the cooperation of VMM 330. For the purposes of simplicity, embodiments of the invention are described in an AMT environment, but embodiments of the invention are not so limited. Instead, any reference to AMT, a "partition", a secure partition", a "security partition" and/or a "management partition" shall include any physical and/or virtual partition (as described above).

Figure 4:
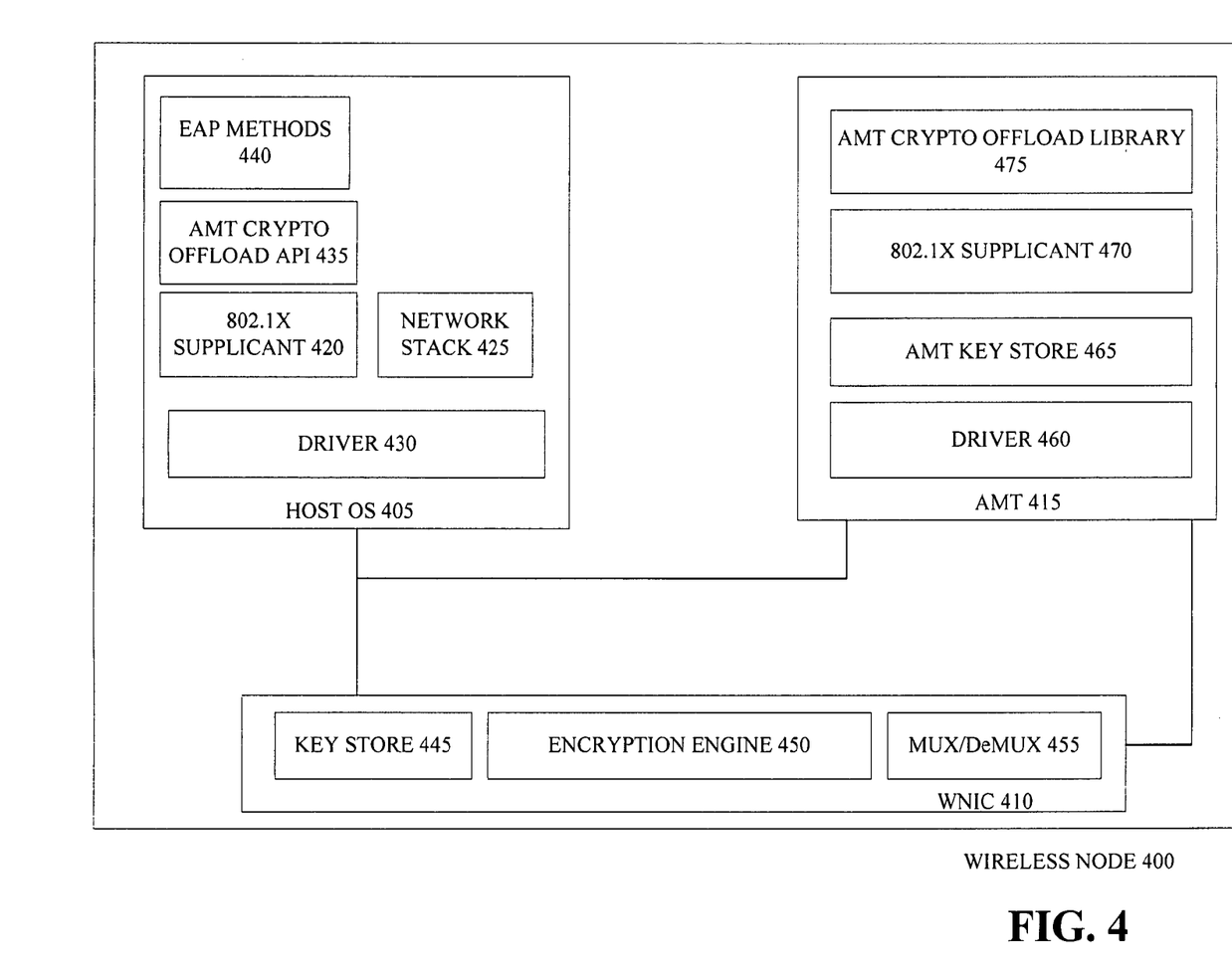
FIG. 4 illustrates conceptually the components of an embodiment of the present invention.

FIG. 4 illustrates an embodiment of the present invention. As illustrated, according to one embodiment of the present invention, a wireless device ("Wireless Node 400") may include at least three logical components, namely a host operating system ("Host OS 405"), wireless local area network ("WLAN") hardware/firmware ("WNIC 410") and a dedicated partition such as an AMT ("AMT 415"). As previously stated, although the following description assumes an AMT, embodiments of the invention are not so limited. In one embodiment, AMT 415 may provide isolation from Host OS 405 (either via a physical separation, a virtual separation or a combination thereof) to enhance the security on the wireless platform.

In order to ensure that the security keys on Wireless Node 400 are isolated from and inaccessible by Host OS 405, an embodiment of the present invention includes a scheme to "offload" portions of the WLAN security key generation process to AMT 415 (i.e., a secure and isolated partition). By generating the security keys within AMT 415 and in one embodiment, storing these security keys in the key store (where both AMT 415 and the key store are isolated from and inaccessible by Host OS 405), embodiments of the present invention provide for heightened security on Wireless Node 400.

As illustrated in FIG. 4, in order to facilitate embodiments of the invention, Host OS 405 may include typical components such an 802.1X supplicant ("Supplicant 420"), a network stack, e.g., Transmission Control Protocol ("TCP"), User Datagram Protocol ("UDP") and/or Dynamic Host Configuration Protocol ("DHCP") (collectively referred to as "Network Stack 425") and a wireless network driver ("Driver 430"). In one embodiment, Host 405 may additionally include an "AMT offload API" ("AMT Crypto Offload API 435") and EAP methods ("EAP Methods 440").

WNIC 410 may include an encryption engine ("Encryption Engine 450"), a multiplexer/demultiplexer ("MUX/DeMUX 455") and in one embodiment, WNIC 410 may include an additional security component, namely a key store ("Key Store 445"). Key Store 445 may be utilized to securely store security keys after they are generated, inaccessible by Host OS 405. In one embodiment, AMT 415 may include various components including a wireless network driver ("Driver 460"), a secure key store ("AMT Key Store 465"), an 802.1X Supplicant ("Supplicant 470"), and an "AMT offload library" ("AMT Crypto Offload Library 475"). The concept of "offload APIs" and "offload libraries" is well known to those of ordinary skill in the art and further description thereof is omitted herein.

The following describes the interaction between these components on Wireless Node 400 to facilitate an embodiment of the present invention. In one embodiment, during initialization of Wireless Node 400, Host OS 405 may initiate control of WNIC 410. Driver 430 in Host OS 405 may perform typical 802.11 authentication procedures (e.g., scanning, discovery, and EAP key management steps), using 802.11 control and management messages. As soon as Driver 430 recognizes a domain (i.e. recognizes a Secure System Identification, hereafter "SSID") that Wireless Node 400 may connect to, and verifies that credentials for this SSID have been provisioned, Driver 430 may initiate initial 802.11i authentication procedures for secure association with the 802.11 Access Point ("AP"), and a backend authentication server (hereafter "AAA server") on Wireless Network 100.

According to an embodiment of the present invention, Driver 430 may "offload" all key derivation functions to AMT 415, to ensure that the key generation (in AMT 415) and storage process (in Key Store 445) are isolated from Host OS 405. Although the specification thus far has referred only to storing the security keys in a key store (e.g., Key Store 445), embodiments of the invention are not so limited. In various other embodiments, the security keys may be stored in other "secure" locations that are isolated from and not accessible by Host OS 405 including but not limited to AMT 415 (e.g., in AMT Key Store 465), in a Trusted Platform Module ("TPM") and/or in a key store on the hard drive on Wireless Node 400. TPMs are well known to those of ordinary skill in the art and typically include one or more hardened storage devices resistant to certain types of user tampering.

To facilitate embodiments of the present invention, EAP Methods 440 and Supplicant 420 on Wireless Node 400 may be modified to utilize AMT Crypto Offload API 435 for invoking all key derivation functions. More specifically, AMT Crypto Offload API 435 may transfer all functions and parameters to AMT 415's AMT Crypto Offload Library 475, which may then execute the functions to generate the PMK. As a result of the transfer of key derivation to AMT 415, in one embodiment, no intermediate and/or final results of any cryptographic computation (for security keys) are available outside AMT 415, i.e., the keys exist only in the secure and isolated environment of AMT 415.

As a result, instead of Host OS 405 having direct access to the PMK once AMT 415 generates the PMK using the Crypto Offload Library 475, AMT 415 may instead merely provide EAP Methods 440 and Supplicant 420 with a reference pointer/identity to the PMK. Host OS 405 thus does not receive the derived PMK but may utilize the derived PMK (via the reference pointer(s)) to perform an 802.11i 4-way handshake. Typically, once the PMK is derived, Host OS 405 performs the 802.11i 4-way handshake to derive the per-session Pairwise Transient Keys ("PTKs"). In one embodiment of the present invention, however, since the PMK is derived on AMT 415, Supplicant 420 on Host OS 405 may transfer control from Host OS 405 to Supplicant 470 on AMT 415 to perform the 802.11i 4-way handshake. The 4-way handshake is described in further detail below.

In one embodiment, EAP Methods 440 and Supplicant 420 may remain unchanged, i.e., these components currently exist and may be used unchanged to facilitate embodiments of the present invention. To facilitate implementation of various embodiments of the present invention on these types of systems (i.e., systems without or systems that do not support Crypto Offload API 435 and Crypto Offload Library 475), an embodiment of the present invention allows the PMK to be derived in Host OS 405 but provides additional measures to protect the PMK. According to this embodiment, various known steps may be taken to ensure that the PMK is protected from illegal read access while a trust relationship is established between AMT 415 and Host OS 405, such that all communication between these entities has the following properties: data confidentiality, data origin authentication, and data integrity. It will be readily apparent to those of ordinary skill in the art that this trust relationship may be achieved in various ways, including using National Institute of Software Testing ("NIST") approved key wrapping mechanisms, pre-shared keys/secrets, asymmetric-key digital certificate mechanisms, and/or an authentication and key management protocol. Thus, for example, platforms with TPM may use a TPM non-migratable key to encrypt the PMK knowing that the key may not be used on any other platform to perform the decryption operation.

According to this embodiment, the PMK may be wrapped (encrypted) and integrity protected using the keys derived from one of the mechanisms described above. The wrapped PMK may be delivered from Supplicant 420 on Host 405 to AMT 415, and AMT 415 may verify the integrity and origin authentication of the encrypted PMK, and then decrypt the PMK. Supplicant 420 on Host OS 405 may then remove the PMK from its memory cache. At this point, AMT 415 may perform the 4-way handshake described in further detail below. Although this scheme may prove less secure than a system including AMT Crypto Offload API 435 and AMT Crypto Offload Library 475, it nonetheless provides some measure of security by reducing the opportunity for PMKs to be copied by rogue software running on Host 405.

Regardless of where the PMK is generated (on Host OS 405 or on AMT 415), once the PMK is available, Wireless Node 400 may proceed with an 802.1μl 4-way handshake. The 802.11i 4-way handshake ensures that transient session keys (i.e., PTKs) are derived to provide confidentiality and integrity protection for all data communication between Wireless Node 400 and the AP (i.e., the PEP). Thus, for example, the transient session keys enable Wireless Node 400 and the AP to confirm that they are not communicating with a replayed session.

According to an embodiment of the present invention, Supplicant 420 on Host OS 405 may indicate to Supplicant 470 on AMT 415 to initiate the 4-way handshake with the AP. In one embodiment, all components necessary for the 4-way handshake may reside on AMT 415. Thus for example, the PMK and nonces (used to generate random numbers), EAPOL-Key messages, security integrity checks and/or deriving PTKs may all reside and/or occur within AMT 415 (e.g., within AMT Key Store 465 or within a TPM, as described below). In one embodiment, if a TPM is available to AMT 415, the TPM may be used to store the PMK, nonces and other information used during PTK derivation. At the conclusion of the 4-way handshake, AMT 415 may have derived PTKs, and AMT 415 may thereafter install the PTKs in WNIC 415's hardware key store, i.e., Key Store 445. AMT 415 may then inform Supplicant 420 that the 4-way handshake is complete and send Supplicant 420 a key ID. Supplicant 420 may then open an 802.1X controlled port for all data traffic and Driver 430 in Host OS 405 may use the key ID to tag data frames for encryption. In one embodiment, the tagged data frames may then be encrypted by WNIC 410 and transmitted by WNIC 410 from Wireless Node 400. In an alternate embodiment, WNIC 410 may be unable to handle encryption of all the frames (e.g., if the volume of frames for encryption is higher than a predetermined threshold that WNIC 410 is able to process). If so, WNIC 410 may reroute the frames to AMT 415 for encryption by AMT 415, inform Driver 430 to send the frames directly to AMT 415 for encryption, and/or a combination of the two. In the latter scenario, AMT 415 may perform encryption of the tagged frames and forward the encrypted frames to WNIC 410, to be transmitted from Wireless Node 400.

According to one embodiment of the invention, to provide protection against MITM attack during the 4-way handshake process, an additional nonce may be supplied to Host OS 405, encrypted with a symmetric key previously provisioned into AMT 415 or by encrypting it with AMT 415's public key. This additional nonce may be mixed with other random nonces supplied by AMT 415 as part of the 4-way handshake. Likewise, the PDP (i.e. the authentication server on the network) may perform similar mixing operations with the nonce to satisfy 4-way handshake. According to this embodiment, this operation may prevent a MITM attack during the 4-way handshake even if the PMK was inadvertently exposed to a rogue on the host or if the PMK is compromised by a hacker.

Figure 5:
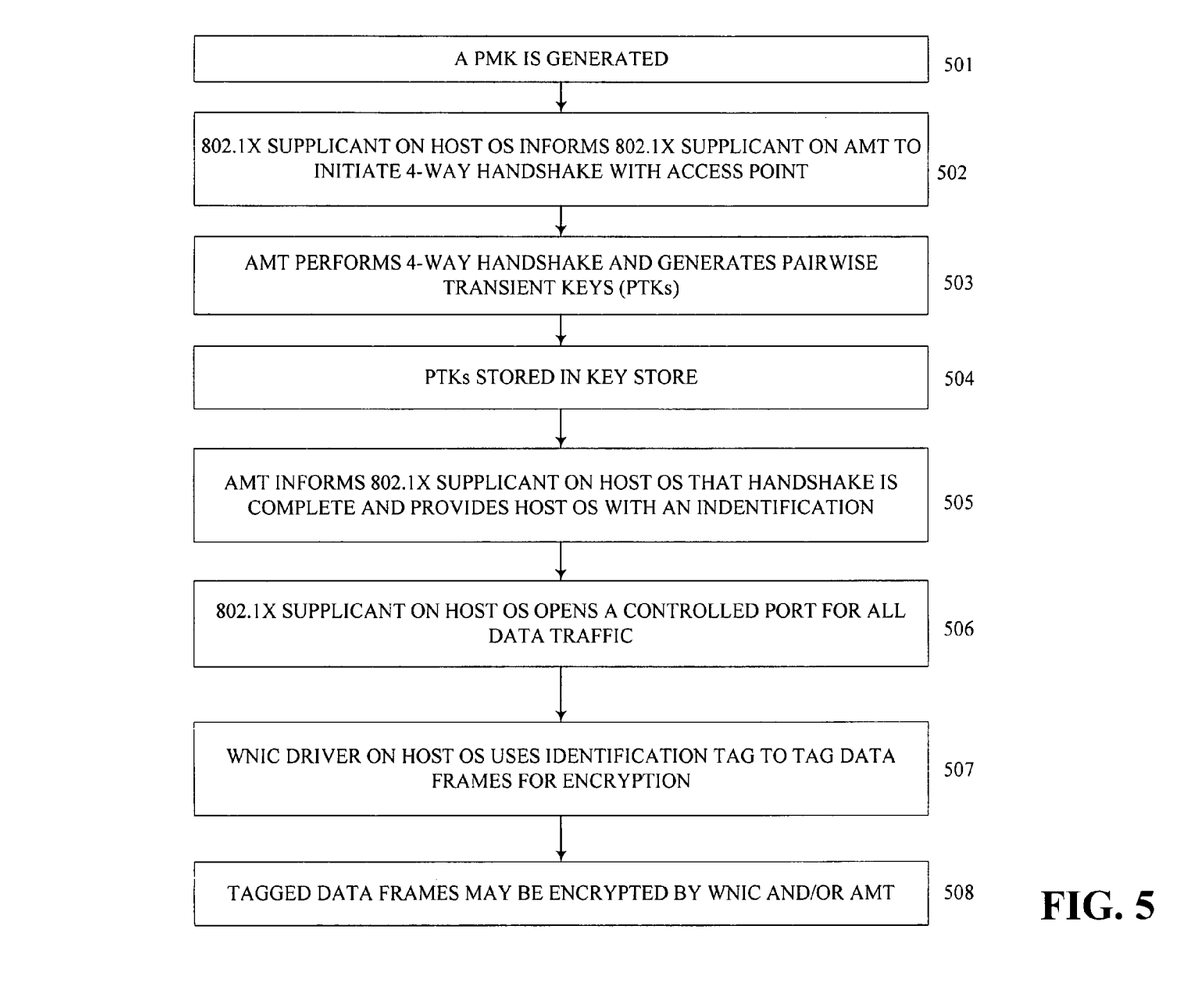
FIG. 5 is a flow chart illustrating an embodiment of the present invention.

FIG. 5 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 501, a PMK may be generated. In one embodiment, the PMK may be generated within AMT 415 while in an alternate embodiment, the PMK may be generated on Host OS 405 and securely transferred to AMT 415. In 502, Supplicant 420 on Host OS 405 may indicate to Supplicant 470 on AMT 415 to initiate a 4-way handshake with an AP. Thereafter, in 503, AMT 415 may perform the 4-way handshake and generate PTKs. The PTKs may then be stored in WNIC 410 in Key Store 445 in 504 and in 505, AMT 415 may inform Supplicant 420 that the 4-way handshake is complete and send Supplicant 420 a key ID. In 506, Supplicant 420 may open an 802.1X controlled port for all data traffic and in 507, Driver 430 on Host OS 405 may use the key ID to tag data frames for encryption. In 508, the tagged data frames may be encrypted in WNIC 410 and/or AMT 415.

The Wireless Nodes and/or APs according to embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
generating a first security key in a dedicated partition on a wireless node, the dedicated partition isolated from a host operating system on the wireless node;
performing a 4-way handshake between the dedicated partition on the wireless node and an access point ("AP") utilizing the first security key; and
generating a transient session security key in the dedicated partition, wherein the dedicated partition is to be accessed by a processor dedicated exclusively to managing the wireless node via the dedicated partition, wherein the first security key is not to be shared with any authentication server, and wherein the transient session security key is to protect confidentiality and integrity of all data communication between the wireless node and the AP during a single session.

2. The method according to claim 1 wherein generating the first security key further comprises the host operating system offloading generation of the first security key to the dedicated partition.

3. The method according to claim 2 wherein offloading generation of the first security key to the dedicated partition is achieved utilizing a cryptographic offload mechanism.

4. The method according to claim 1 wherein generating the first security key comprises generating a Pairwise Master Key ("PMK") and generating the transient session security key comprises generating at least one Pairwise Transient Key ("PTK").

5. The method according to claim 4 further comprising storing the PTK in a key store on the wireless node.

6. The method according to claim 5 further comprising providing an identification corresponding to the PTK to the host operating system, the host operating system capable of utilizing the identification to tag data frames for encryption.

7. The method according to claim 6 wherein the data frames tagged for encryption may be encrypted in one of the dedicated partition or a network adapter on the wireless node.

8. The method according to claim 1, wherein the dedicated partition comprises an Active Management Technologies (AMT) partition that is a virtualized partition.

9. The method according to claim 1 wherein generating the first security key in the dedicated partition comprises generating the first security key in an unsecure partition and securely transferring the first security key to the dedicated partition.

10. The method according to claim 1 wherein the 4-way handshake is defined by an 802.11 protocol.

11. The method of claim 1, wherein the transient session security key is to enable the wireless node and the AP to confirm that they are not communicating with a replayed session.

12. A system comprising:
a hardware memory device to store a host partition to facilitate running a host operating system and an application; and
a dedicated partition isolated from the host partition, the dedicated partition capable of generating a first security key, the first security key for performing a 4-way handshake between the dedicated partition and an access point ("AP") to generate at least one transient session security key, wherein the dedicated partition is to be accessed by a processor dedicated exclusively to managing a wireless node via the dedicated partition, wherein the first security key is not to be shared with any authentication server, and the transient session security key is to protect confidentiality and integrity of all data communication between the wireless node and the AP during a single session.

13. The system according to claim 12 further comprising: a key store isolated from the host partition, the key store capable of securely storing the at least one transient session security key.

14. The system according to claim 13 wherein the dedicated partition is capable of providing the host operating system with an identifier corresponding to the at least one transient session security key, the host operating system capable of utilizing the identification to tag data frames for encryption.

15. The system according to claim 14 further comprising a network adapter, wherein the data frames tagged for encryption may be encrypted in one of the dedicated partition or the network adapter.

16. The system according to claim 12 wherein the first security key includes a Pairwise Master Key ("PMK") and the at least one transient session security key includes at least one Pairwise Transient Key ("PTK").

17. The system according to claim 12 wherein the dedicated partition is to comprise an Active Management Technologies (AMT) partition that is a VM running in a virtualized environment.

18. The system of claim 12, wherein the transient session security key is to enable the wireless node and the AP to confirm that they are not communicating with a replayed session.

19. An article comprising a non-transitory machine-accessible medium having stored thereon instructions that, when executed by a machine, cause the machine to:
generate a first security key in a dedicated partition on a wireless node, the dedicated partition isolated from a host operating system on the wireless node;
perform a 4-way handshake between the dedicated partition on the wireless node and an access point ("AP") utilizing the first security key; and
generate a transient session security key within the dedicated partition, wherein the
dedicated partition is to be accessed by a processor dedicated exclusively to managing a wireless node via the dedicated partition, wherein the first security key is not to be shared with any authentication server, and the transient session security key is to protect confidentiality and integrity of all data communication between the wireless node and the AP during a single session.

20. The article according to claim 19, wherein the instructions, when executed by the machine, further cause the machine to generate the first security key by the host operating system offloading generation of the first security key to the dedicated partition.

21. The article according to claim 19, wherein the instructions, when executed by the machine, further cause the machine to generate the first security key comprising a Pairwise Master Key ("PMK") and generate the transient session security key comprising at least one Pairwise Transient Key ("PTK").

22. The article according to claim 21, wherein the instructions, when executed by the machine, further cause the machine to provide an identification corresponding to the PTK to the host operating system, the instructions further capable of causing the host operating system to utilize the identification to tag data frames for encryption.

23. The article according to claim 21, wherein the instructions, when executed by the machine, further cause the machine to store the PTK in a key store on the wireless node.

24. The article according to claim 19, wherein the instructions, when executed by the machine, further cause the machine to encrypt the data frames tagged for encryption in one of the dedicated partition or a network adapter on the wireless node.

25. The article according to claim 19, wherein the instructions, when executed by the machine, further cause the machine to generate the first security key in the dedicated partition by generating the first security key in an unsecure partition and securely transferring the first security key to the dedicated partition.

26. The article according to claim 19 wherein the instructions, when executed by the machine, further cause the machine to perform the 4-way handshake according to an 802.11 protocol.

27. The article according to claim 19, wherein the transient session security key is to enable the wireless node and the AP to confirm that they are not communicating with a replayed session.

* * * * *